June 26, 1923.
G. M. EAMES ET AL
1,460,195
MACHINE FOR THREADING TAPE INTO ARTICLES
Filed Aug. 25, 1919    4 Sheets-Sheet 1
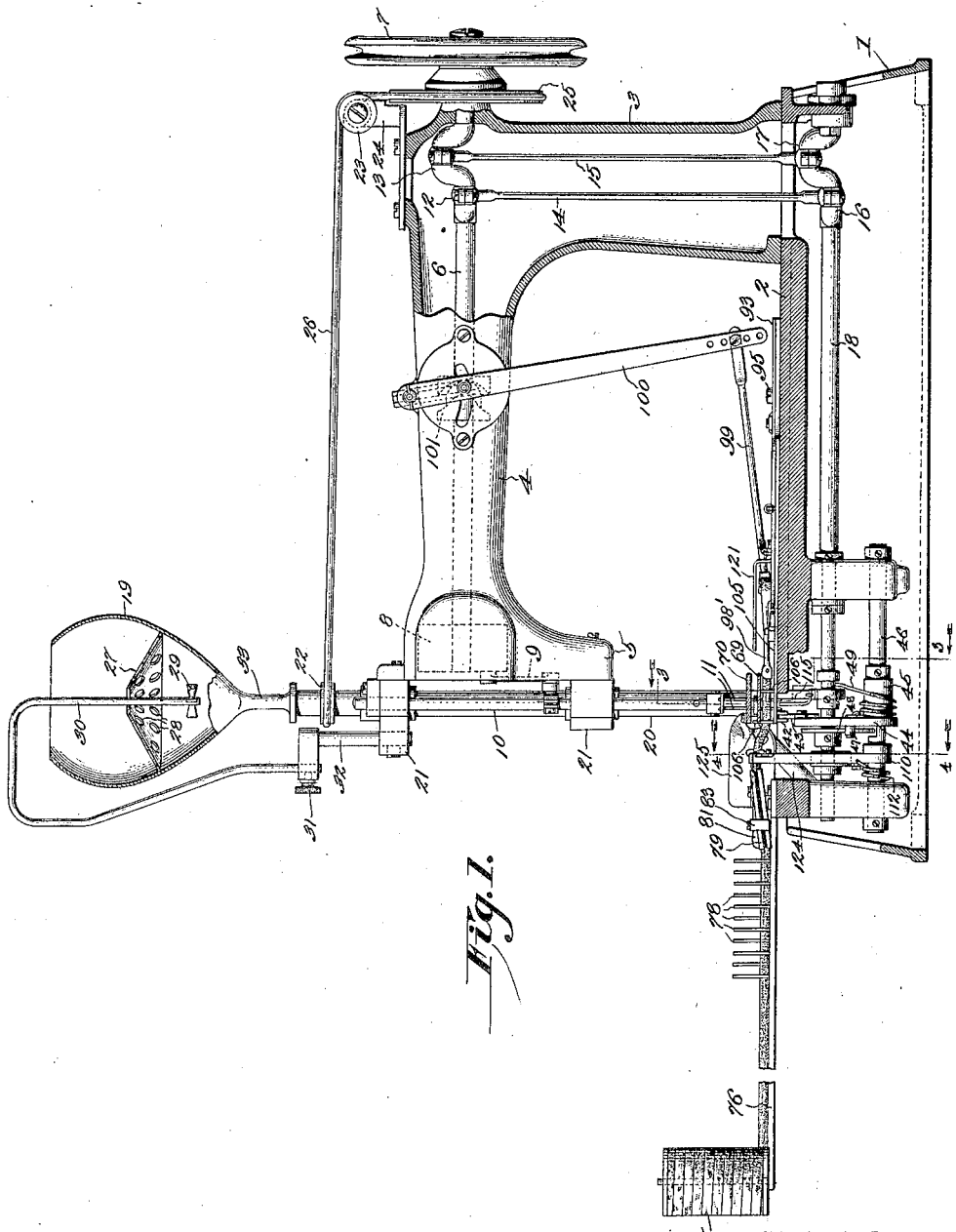
WITNESSES:
INVENTORS
George M. Eames 3rd
John C. Ringe,
BY
ATTORNEY

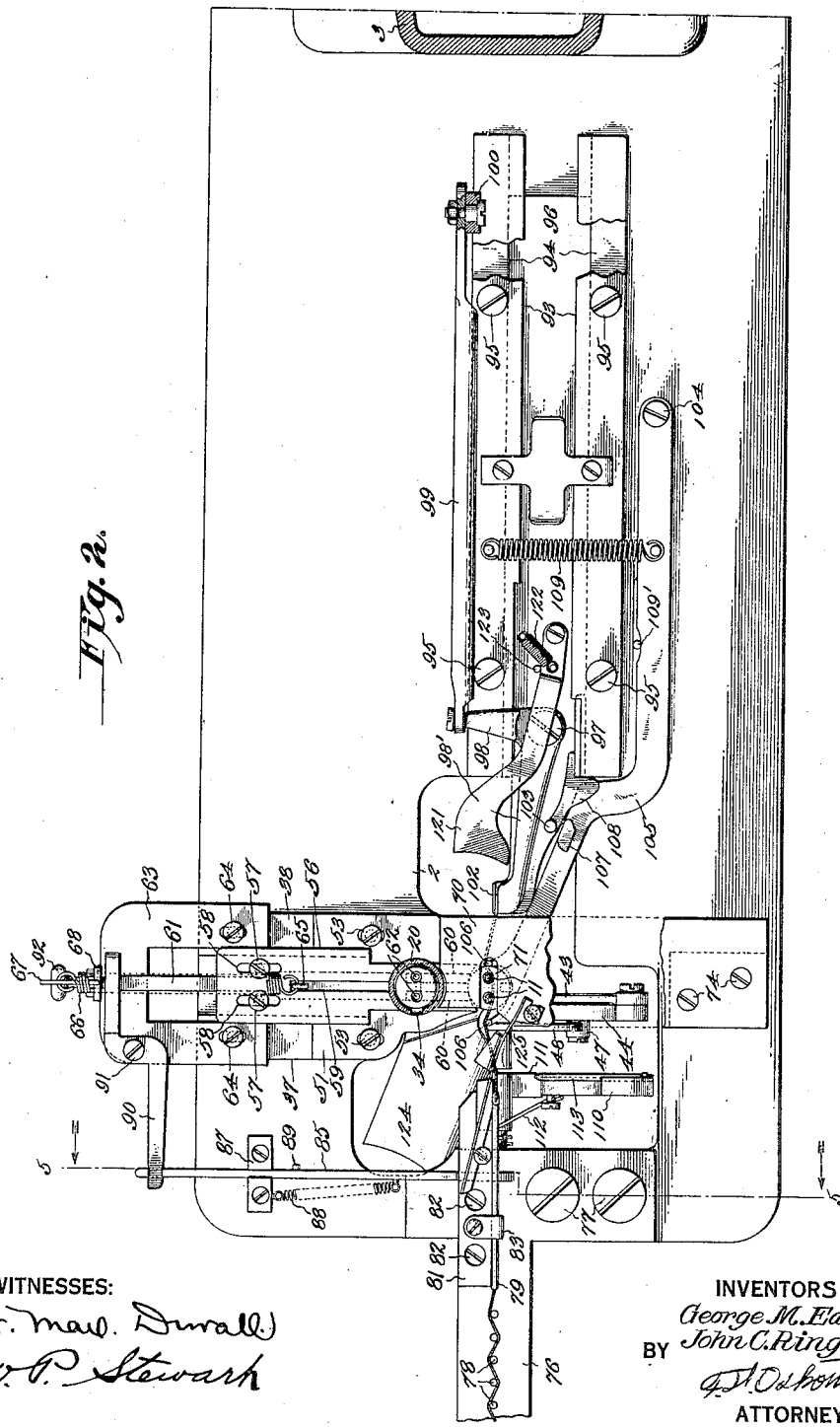

June 26, 1923.
G. M. EAMES ET AL
1,460,195
MACHINE FOR THREADING TAPE INTO ARTICLES
Filed Aug. 25, 1919  4 Sheets-Sheet 3
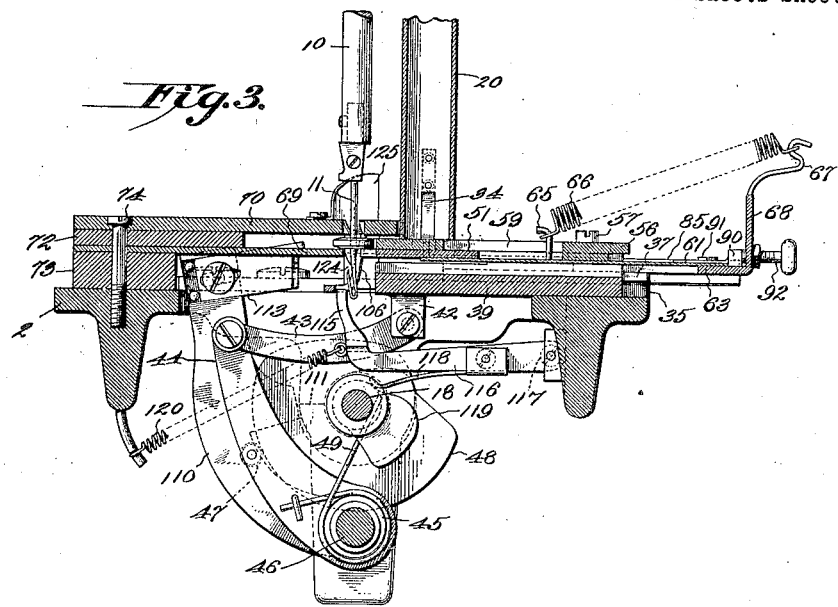
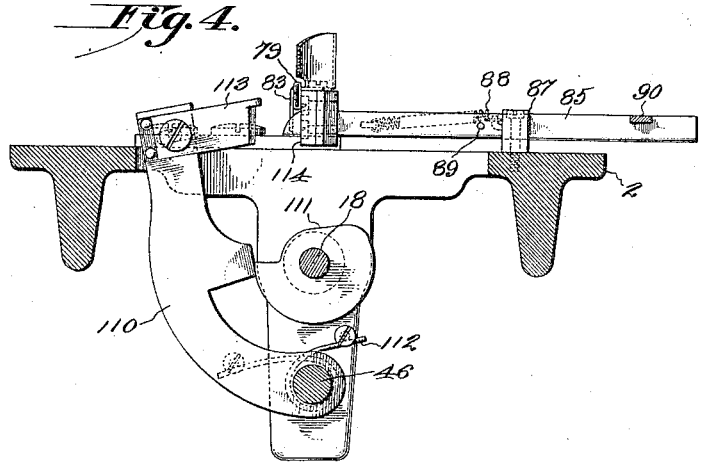
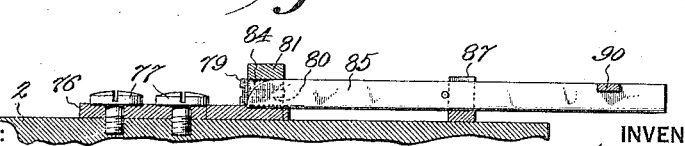
WITNESSES:
INVENTORS
George M. Eames
BY John C. Ringe,
ATTORNEY

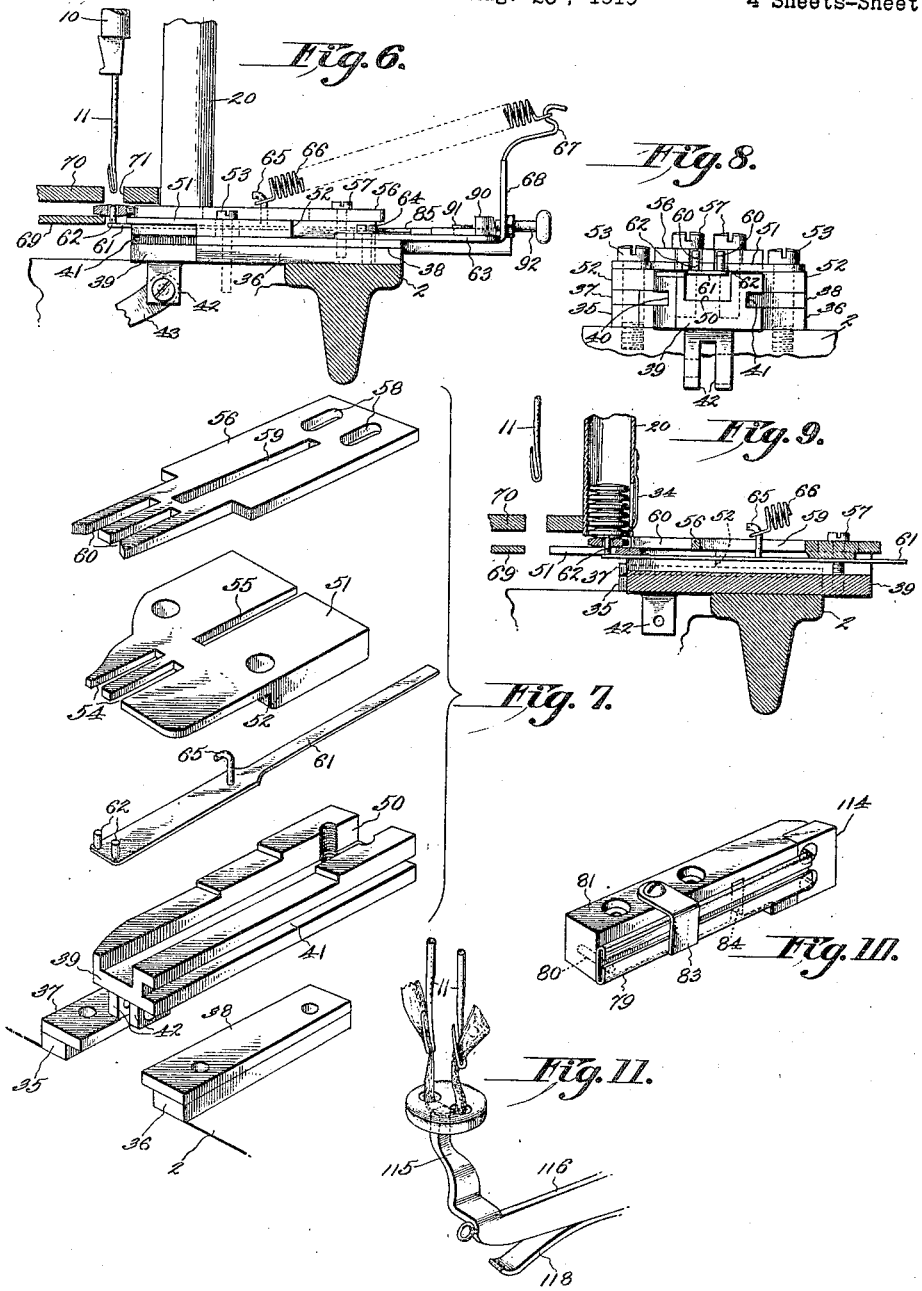

Patented June 26, 1923.

1,460,195

UNITED STATES PATENT OFFICE.

GEORGE M. EAMES, OF BRIDGEPORT, AND JOHN C. RINGE, OF STRATFORD, CONNECTICUT, ASSIGNORS TO THE SINGER MANUFACTURING COMPANY, A CORPORATION OF NEW JERSEY.

MACHINE FOR THREADING TAPE INTO ARTICLES.

Application filed August 25, 1919. Serial No. 319,720.

*To all whom it may concern:*

Be it known that we, GEORGE M. EAMES and JOHN C. RINGE, citizens of the United States, residing at Bridgeport and Stratford, respectively, in the county of Fairfield and State of Connecticut, have invented certain new and useful Improvements in Machines for Threading Tape into Articles, of which the following is a specification, reference being had therein to the accompanying drawings.

This invention relates to improvements in machines for threading tape into buttons and like articles.

The primary object of this invention is to provide a machine adapted to automatically perform the complete operation of threading short lengths of tape into articles in a manner permitting the ready attachment, in a subsequent operation, of the threaded articles to garments.

Another object of this invention is to provide in machines of this character means for automatically feeding the articles to threading position; to positively insure the alinement of the apertures in the articles with the threading implements, and to sustain the articles against the oppositely directed thrusts of the threading implements.

The invention has for a further object to provide means for automatically feeding the tape across the path of movement of the threading implements.

A still further object of the invention is to provide means for insuring the seizure of the tape by the threading implements.

Also within the scope of this invention is the means provided for severing suitable lengths of tape; for ejecting the threaded article from threading position, and for directing the ejected article away from moving parts of the machine.

Another object of this invention is to provide means for preventing relative movement of the tape and articles of different thicknesses during the threading operation.

The present invention has also for its object to prevent the severing of tape in the absence of an article from threading position, thereby avoiding waste and possible clogging of the machine.

Other objects of the invention will be apparent from the following description and claims.

In a practical embodiment of the present invention, a machine is provided with reciprocating, hooked threading-implements adapted to draw the free ends of a short length of tape through the apertures of an article such as buttons, buckles and the like. In order to automatically feed the articles into threading position, the articles are placed in a receptacle of a hopper from which leads a chute adapted to sustain the articles in superposed or column formation. The hopper is rotated by suitable connections with the driving shaft of the machine, and by means of a light spring bearing upon the lowermost article, the latter is caused to rotate with the chute of the hopper and upon article-registering pins until the apertures of the article aline with and are entered by said pins. An article feed-slide is then brought into operation to advance the registered article to threading position. The threading implements now move to enter the apertures in the articles and disengage the registering pins which are immediately retracted to their initial position beneath the chute.

During the article penetrating movement, relatively movable tape-gripping jaws are actuated to seize the end of the tape and draw it across the path of the threading implements. To insure that the tape enters the hooks of the threading implements during the withdrawal movement of the latter, suitably actuated tape-positioning fingers engage the tape upon opposite sides and hold it against the shanks of the implements. A tape-severing device now comes into operation and severs the tape at a distance from one implement substantially equal to the distance that the end of the tape was drawn by the tape-gripping jaws past the other implement. As the implements draw or thread the tape through the apertures in the article, a tape-holding finger engages the tape between the apertures of the article and holds it against movement relatively thereto so as to insure that the free ends of the threaded tape are of substantially equal lengths. After the article is threaded, an article-ejector engages the same and thrusts it from threading position, a chute and a guard being provided to direct the article away from the moving parts of the machine.

The tape is led from its supply reel through a tape-guide adapted to normally hold the tape out of the path of operation of the tape-feeding means. The position of the tape-guide is, in the present instance, controlled by the article-registering pin in a manner such that only when a button is seated upon the pin and fed to threading position, is the tape-guide lowered to permit the gripping-jaws to seize the tape.

In the accompanying drawings, Fig. 1 is a view in front elevation and partly in section of the present improvement as embodied in a machine. Fig. 2 is an enlarged top-plan view of the machine shown in Fig. 1, omitting the overhanging arm and with portions partly broken away to better illustrate the operating mechanism. Fig. 3 is a sectional view substantially on the line 3—3, Fig. 1. Fig. 4 is a sectional view substantially on the line 4—4 of Fig. 1. Fig. 5 is a sectional view substantially on the line 5—5 of Fig. 2. Fig. 6 is a side view in elevation of the article feed-slide and showing the registering pins in threading position. Fig. 7 comprises separate views in perspective of the feed-slide, the article-supporting plate and the slide-bar carrying the article registering pins. Fig. 8 is a view in end elevation of the feed-slide and guide. Fig. 9 is a sectional view in elevation of the feed-slide and showing the registering-pins in retracted position beneath the chute. Fig. 10 is a perspective view of the tape-guide and the ledger-blade of the severing-device. Fig. 11 is a detail perspective view illustrating the tape-holder in action during the threading of the article.

Referring to the drawings, the present improvement is embodied in a machine supported on a base 1 and comprising a bed-plate 2 from which rises the hollow-standard 3 of the bracket-arm having a tubular overhanging arm 4, terminating in the head 5.

Journaled in suitable bearings provided in the bracket-arm is the main or driving shaft 6, carrying at one end a belt-wheel 7 and at its opposite end a shaft-flange 8 having a link 9 connection with a bar 10 vertically reciprocable in bearings provided in the head 5. At its lower end the bar 10 carries a pair of hooked threading-implements 11, in the present instance arranged substantially in parallelism. The driving shaft 6 is formed with offset cranks 12 and 13 connected by means of pitmen 14 and 15 with similar cranks 16 and 17, upon an actuating shaft 18 journaled in suitable bearings depending from the bed-plate 2.

Referring now more particularly to the means employed for automatically presenting the articles to the threading implements, an article hopper comprising a receptacle 19 and a chute 20 connected therewith is journaled for rotation upon its longitudinal axis in vertically alined bearings provided in lugs, as 21, projecting from the head 5. The article-hopper may be rotated by means of any well known connections with the driving shaft, those employed in the present instance comprising a belt-pulley 22 upon the chute 20, idler pulleys 23 (only one of which is shown) carried by a bracket 24 upon the bracket-arm, a belt-pulley 25 upon the driving shaft 6 and a belt 26 connecting said pulleys. Located within so as to be rotatable with the receptacle 19 is a sieve 27 having the outline of a truncated cone and formed with a plurality of apertures, as 28, of a size preventing entrance into the chute of articles larger than can be readily accommodated thereby. In order to agitate the articles passing into the chute 20, a stationary propeller-like member 29 is rigidly supported within the receptacle by a rod 30 passing through a central aperture in the sieve and adjustably secured by means of a set-screw 31 upon a bracket 32 on the head 5. The relative rotation between the hopper and the member 29 agitates the articles and urges their entrance into the chute, the articles being compelled to enter the chute singly owing to the narrowed throat 33 provided at the base of the receptacle. The chute 20 is shaped according to the class of articles to be threaded and in the present instance is shown cylindrical to accommodate flat buttons.

At its lower end, which is immediately above the bed-plate, the chute 20 is formed with a longitudinal slot entered by a light spring 34 adapted to engage the lowermost of the articles supported by the chute in column formation. The function of this spring is to compel rotation of the article engaged thereby with the chute for a purpose which will hereinafter appear.

Secured upon the upper surface of the bed-plate 2 and in spaced relation with respect to each other are two supporting blocks 35 and 36 upon which are placed plates 37 and 38 overlapping the adjacent longitudinal edges of the supporting blocks to form guide-ribs. Slidingly mounted upon these guide-ribs is a slide-block 39 having grooved guide-ways 40 and 41 fitted upon said guide-ribs. Depending from the slide-block are spaced, apertured lugs 42 suitably connected with one end of a link 43, of which the opposite end is connected with the free end of an arm 44 projecting from a lateral sleeve 45 loosely journaled upon a fulcrum-shaft 46 journaled in the lugs forming bearings for the actuating shaft 18. Supported so as to project laterally from the arm 44 is a roller 47 in constant engagement with a cam 48 upon the shaft 18, being held in contact with said cam by the action of a suitably arranged spring 49. It is evident that rotation of the shaft 18 will, by means of the described connections, reciprocate the slide-block 39 toward and from the path of movement of the threading implements. The slide-block 39 is provided with a longitudinal groove 50 in its upper surface for a purpose later referred to.

Overlying the slide-block 39 so as not to frictionally retard the reciprocation of the latter is a stationary article-supporting plate 51 provided on its under side with spacing lugs, as 52, secured to the bed-plate by screws, as 53, which also serve to secure the forward ends of the supporting-blocks 35 and 36. The article-supporting plate 51 is formed with adjacent slots, as 54, extending to the forward edge thereof and with a third slot 55 extending to the rear edge of said plate. An article feed-slide plate 56 is adjustably secured upon the slide-block 39 by screws as 57 passing through elongated apertures, as 58 formed in the plate 56 and entering threaded apertures in the slide-block 39. The plate 56 is provided with a central slot 59 overlying the slot 55, and with two slots 60 in vertical alinement with the slots 54 in the article supporting plate 51. The forward or article engaging edge of the plate 56 is preferably shaped to correspond substantially with the contour of the articles to be threaded and in the present instance is arcuate.

An article-registering-pin carrying slide 61 is disposed within the groove 50 of the slide-block 39 beneath the article-supporting plate 51 and carries at its forward end two upwardly projecting article-registering pins, as 62. The pins 62 project upwardly through the adjacent slots 54 of the article supporting plate and may project into the slots 60 of the feed-slide plate 56. The rearward end of the pin-carrying slide 61 in retracted position rests upon the cross-bar of a substantially U-shaped support 63 adjustably secured by screws, as 64 upon the bed-plate 2, said screws also passing through threaded apertures in the supporting blocks 35 and 36, and through like apertures in the plates 37 and 38, thereby securing the rearward ends of the latter. Intermediate its ends, the pin-carrying slide 61 is provided with a hook 65 projecting upwardly through the slot 55 in the article supporting plate and through the slot 59 in the feed-slide plate. The hook 65 is connected by means of a coiled spring 66 with a hook 67 on an upwardly extending arm 68 on the support 63. The spring 66 serves to hold the pin-carrying slide 61 against the under surface of the supporting-plate 51 and tends to hold the slide in retracted position.

In their retracted position, as illustrated in Fig. 9 of the drawings, the pins 62 are directly beneath the delivery end of the chute 20, the lowermost article in the chute, when not registered, resting upon said pins. Rotation of the article with the chute brings the apertures of the former into alinement with the pins 62 whereupon the article drops by gravity upon the article-supporting plate 51 with the pins 62 registering the apertures of the article. The cam 48 now acts to advance the feed-slide 56 which engages the pinned or registered article and advances it to threading position as illustrated in Fig. 6 of the drawings. It will be observed that the upper surface of the feed-slide 56 is in substantially the same plane as the lower edge of the chute 20, thereby serving during the feed of the article to aid the spring 34 in supporting the column of articles. The threading implements 11 now move downwardly to enter the apertures of the articles and thereby depress the pins, which action is permitted by the clearance provided by the groove 50 of the slide-block 39. The pins, when clear of the article are immediately retracted by the spring 66 into their initial position, the feed-slide 56 remaining however in its advance position until the threading implements on their upward movement are about to emerge from the apertures of the article, whereupon the feed-slide is rapidly retracted to its initial position.

In its threading position, one edge of the article is supported against the downward thrust of the implements upon the advance end of the supporting-plate 51 and on its opposite edge upon the advance end of a complemental supporting-plate 69. Against the upward thrust of the implements, the article is sustained by a plate 70 suitably slotted at 71 for the entrance of the implements and to provide clearance for the tape of the threaded article when the latter is ejected from threading position, as will hereinafter appear. The article-supporting plates 69 and 70 are held in spaced relation by a block 72 and in spaced relation with respect to the bed-plate 2 by a block 73, all of which are secured upon the bed-plate 2 by means of screws, as 74.

A tape-supply is afforded by a spool 75 of tape, supported upon a lateral arm 76 secured upon the bed-plate 2 by screws as 77. From the spool, the tape is passed through tensioning pins as 78 into a tape-guide 79. This tape-guide is pivoted near the rearward end thereof upon a pin 80 entering an aperture in a block 81 secured by screws, as 82, upon the arm 76. A guide 83 maintains the tape-guide in a vertical plane during its pivotal movements. The block 81 is provided with a transverse slot 84 entered by a tape-guide tilting-bar 85 of which the advance end is rounded. The bar 85 is adapted to be longitudinally reciprocated in the slot 84 and in a slot alined therewith formed in a guide 87 suitably secured upon the bed-plate. A coiled spring 88 connected at opposite ends to the guide and the bar 85 tends to hold the latter in retracted position clear of the tape-guide and determined by the pin 89 engaging the guide 87.

The bar 85 is forcibly advanced to engage the tape-guide and swing the latter upon its pivotal support through the engagement thereof by one end of a two-armed lever 90, fulcrumed intermediate its ends upon the support 63 by means of a screw 91. The other end of the lever 90 extends into the path of movement of the slide 61 and consequently when the latter is retracted under the action of the spring 66 as described, the bar 85 is advanced to lift the delivery end of the tape-guide. The advancing movement of the slide is limited by the engagement with the lever 90 of an adjusting screw 92, threaded into the arm 68. From this construction it is apparent that the position of the delivery end of the tape-guide is dependent upon the movement of the article registering pins 62 inasmuch as the spring 66 is relatively stronger than the spring 88. In other words, if no article is dropped into register with the pins, then the feed-slide 56 moves idly, the pins remaining stationary by reason of the slots 60 provided in the feed-slide, consequently maintaining the delivery end of the tape-guide in raised position. When however an article is registered by the pins 62, the advancing movement of the pins under the action of the feed-slide upon the article permits the spring 88 to retract the bar 85 whereupon the delivery end of the tape-guide is promptly lowered by gravity.

Referring now more particularly to the tape-feeding means, a slide-way is provided on the bed-plate 2 by parallel plates as 93, overhanging the edges of spacing bars, as 94, which are together secured upon the bed-plate by screws, as 95. Mounted to reciprocate in this slide-way is a slide-bar 96 transmitting actuation to the tape-feeding jaws. article-ejector and the tape-positioning fingers. Upon the advance end of the slide-bar 96 is fulcrumed, by means of a screw 97, a two-armed lever, of which one arm 98 is adjustably connected by means of a link 99 with a vibratory arm 100 suitably fulcrumed upon the overhanging bracket-arm of the machine and vibrated in a well known manner from a cam 101. The free end of the other arm 98' of the two-armed lever forms one member of tape-gripping jaws of which the cooperating member is formed by an ear 102 upturned from the slide-bar 96. Adjacent the arm 98' of the lever, a pin 103 projects upwardly from the slide-bar 96. It will be understood that when the slide-bar is in its extreme retracted position, i. e., toward the right in Fig. 2 of the drawings, and the arm 100 is vibrated toward the left, then the first action thereof is to swing the lever 98—98' until it engages the pin 103 thereby opening the tape-gripping jaws. Further oscillation of the lever 98—98' being prevented by the pin 103, the slide-bar 96 is bodily advanced until the open tape-gripping jaws are immediately in advance of the delivery end of the tape-guide 79 with the jaws upon opposite sides of the projecting end of the tape. The arm 100 now reverses its movement, first causing the lever 98—98' to swing on its pivot thereby closing the jaws to grip the tape therebetween. The continued movement of the arm 100 causes the slide-bar 96 to be retracted, consequently drawing the tape across the path of the threading implements into substantially the position indicated in Fig. 2. The path of movement of the tape-gripping jaws is such that only when the delivery end of the tape-guide is in its lowered position will the jaws seize the tape. Consequently, as the delivery end of the tape-guide is lowered only when an article is delivered to threading position, the tape will not be fed in the absence of an article from threading position. This feature is important owing to its function of preventing clogging of the machine under abnormal conditions and also obviating waste of tape.

Fulcrumed upon the bed-plate 2 by means of a screw 104 is a tape-positioning arm 105 having at its free end spaced tape-positioning fingers, as 106 and intermediate its ends a cam-lug 107. The cam-lug 107 is adapted to be engaged by a cam 108 provided on the slide-bar 96 so that on the advancing movements of the latter into tape-gripping position, the fingers 106 are diverted against the action of a spring 109 out of the path of movement of the tape-gripping jaws, one of which then engages the fingers to hold them in deflected position. After the slide-bar 96 has been retracted sufficiently to provide clearance for the cam-lug 107, the spring 109 acts to cause the fingers 106 to engage the tape upon opposite sides of the ascending threading implements and hold it against the shanks of the latter, thereby insuring the seizure of the tape by the hooks of the implement. This position of the fingers is determined by a pin 109' engaging the arm 105.

Fulcrumed upon the shaft 46 is a knife-carrying arm 110 adapted to be actuated by a cam 111 on the shaft 18 and held thereagainst by the action of a spring 112. Adjustably secured upon the knife-carrying arm 110 is a knife-blade 113 of which the severing edge is movable across the path of the tape and cooperates with a stationary or ledger-blade 114 suitably secured upon the block 81. The cam 111 is designed to permit the knife to operate when the tape-gripping jaws have completed their tape-drawing movement and the plane of operation of the knife-blade is preferably spaced from the nearest threading implement a distance substantially corresponding to the distance that the free end of the tape was drawn past the other implement by the tape-feeding means.

A tape-holding finger 115 is provided upon a vibrating arm 116 pivotally mounted upon the machine frame by means of a screw 117. A spring 118 is suitably secured upon the arm 116 and is adapted to be in constant engagement with a cam 119 upon the shaft 18 by the action of a spring 120. The spring 118 is sufficiently strong to cause elevation of the finger 115, but will yield under abnormal conditions. The function of the finger 115 is to engage the tape, as shown, in Fig. 11 of the drawings, between the apertures of the article and hold the tape against bodily movement during the threading operation, thereby insuring that the free ends of the threaded tape are of substantially equal lengths.

After the threading operation, as herein described, is completed and the slide-bar 96 is again advancing the gripping-jaws, the free-end of an article ejector 121, pivotally mounted upon the slide-bar engages the threaded article and ejects it from threading position. The ejector is normally held by a spring 122 against a stop-pin 123 on the slide-bar; but as the article advances into threading position before the ejector is entirely retracted beyond said position, the spring 122 permits the article to swing the ejector laterally on its fulcrum between the plates 69 and 70 so as not to interfere with the succeeding threading operation. The further retraction of the slide-bar 96 carries the ejector rearwardly whereupon the spring 122 swings it into initial position. The ejected article is carried away from moving parts of the machinery by means of a chute 124 depending from the article supporting plate 51. A guard 125 is suitably secured upon the block 81 and plate 70, and acts to prevent the tape of the threaded article from being caught during the ejection thereof.

The sequence of operation of the several mechanisms of the machine is evident from the foregoing description. It may be added however that the machine is adapted to thread in an entirely automatic manner, an article at each revolution of the main-shaft, so that a single operator may have a number of these machines in operation simultaneously, thereby greatly increasing the product at a comparatively low cost. It is to be also understood that various modifications may be made without departing from the spirit and scope of the invention.

Having thus set forth the nature of the invention, what we claim herein is:—

1. A machine for threading tape into buttons comprising, in combination, threading implements, means for feeding a button into threading position, means for feeding a tape into threading position, means for severing a section of tape, and means for actuating said implements to thread a severed section of tape into said button.

2. A machine for threading tape into buttons comprising, in combination, hooked threading implements, a button-hopper, means for feeding buttons from said hopper into threading position, a tape feeding device for presenting a tape to said threading implements, and means for actuating said implements to automatically seize the tape and thread it into said buttons.

3. A machine for threading short sections of tape into buttons including, in combination, a button-hopper, means for feeding buttons from said hopper into threading position, and means including a plurality of hooked threading implements constructed and arranged to seize a tape section, draw an end of said tape section through a positioned button and subsequently release the tape section.

4. A machine for threading tape into buttons and like articles comprising, in combination, threading implements, means for feeding an article into threading position, means for feeding a tape into threading position, and means for preventing the feeding of the tape in the absence of an article from threading position.

5. A machine for threading short sections of tape into buttons including, in combination, tape-threading implements, means for actuating said implements, means for holding a button in position for entrance by said implements, and means for feeding tape into position to be engaged by said implements for threading into said button.

6. A machine for threading short sections of tape into buttons including, in combination, tape-threading implements, means for actuating said implements, means for holding a button in position for entrance by said implements, means for feeding tape into position to be engaged by said implements for threading into said buttons, and means for severing the desired lengths of tape.

7. A machine for threading tape into buttons including, in combination, tape-threading implements, means for actuating said implements, means for holding a button in position for entrance by said implements, means for feeding a tape into position to be threaded into said button, and means for holding the tape against bodily movement during the operation of threading said tape into the button.

8. A machine for threading tape into buttons including, in combination, tape-threading means, means for sustaining a button in threading position during the threading thereof, and means for engaging the threaded button and ejecting the latter from threading position.

9. A machine for threading tape into buttons, including, in combination, a pair of threading implements, means for sustaining a button in position for entrance by said implements, tape feeding means, and means for insuring the seizure of the tape by said threading implements.

10. In a machine wherein the apertures of buttons and like articles are positioned for the entrance of a threading implement, a button-holder, an article registering pin, and means for revolving the button-holder and a button carried thereby to impale a button upon said registering pin.

11. In a machine wherein the apertures of buttons and like articles are positioned for the entrance of a threading implement, a hopper for said articles, an article registering pin, means for revolving said hopper, and means for causing the lowermost article to revolve with the hopper to insure the entrance of said pin in an aperture of the article.

12. In a machine wherein the apertures of buttons and like articles are positioned for the entrance of a threading implement, the combination with a reciprocating threading implement, of a hopper for said articles, an article registering pin, means carried by said hopper for revolving the article to cause said pin to engage an aperture thereof, and means for positioning the article in the path of movement of the threading implement.

13. In a machine wherein the apertures of buttons and like articles are positioned for the entrance of a threading implement, the combination with a reciprocating threading implement, of an article registering pin adapted to enter an aperture in the article and to be disengaged therefrom by said threading implement, and means for actuating said pin to position the article in the path of the threading implement.

14. In a machine wherein the apertures of buttons and like articles are positioned for the entrance of a threading implement, the combination with a reciprocating threading implement, of an article registering pin adapted to enter an aperture in the article and to be disengaged therefrom by said threading implement, means for advancing said pin and article into threading position, and means for retracting the pin when disengaged from the article by said threading implement.

15. In a machine wherein the apertures of buttons and like articles are positioned for the entrance of a threading implement, the combination with a reciprocating threading implement, of an article registering pin adapted to enter an aperture in the article and to be disengaged therefrom by said threading implement, a rotary hopper adapted to seat an article upon said pin, a slide-bar adapted to position the article in the path of the threading implement, and means for retracting the pin when disengaged from the article by said threading implement.

16. A machine for threading tape into buttons and like apertured articles including, in combination, a plurality of threading implements, means for automatically feeding the articles into threading position, means for sustaining said articles during the threading thereof, and means engaging the threaded articles and ejecting said articles from threading position.

17. In a machine for threading tape into buttons and like apertured articles, in combination, a threading implement, a hopper adapted to sustain the articles in a column formation, means for axially rotating said hopper, and means for causing the lowermost button of said column to rotate with said hopper.

18. In a machine for threading tape into buttons and like articles, in combination, a threading implement, a hopper comprising an article-receptacle and an article-chute leading from said receptacle, an article sieve located within said receptacle adapted to prevent choking of said chute by articles larger than can be readily accommodated thereby.

19. In a machine for threading tape into buttons and like articles, in combination, a threading implement, a hopper comprising an article-receptacle and an article-chute leading from said receptacle, of an article sieve located within said receptacle adapted to prevent choking of said chute by articles larger than can be readily accommodated thereby, and means for agitating the articles before entrance into said chute.

20. A machine for threading tape into buttons and like articles including, in combination, tape-threading means, means for feeding an article into threading position, a tape-guide, a tape-feeder, and means for holding said tape out of the path of operation of said tape-feeder in the absence of an article from threading position.

21. A machine for threading tape into buttons and like articles including, in combination, tape-threading implements, means for reciprocating said implements, a tape-guide, a slide-bar provided with a tape-gripping jaw, a cooperating tape-gripping jaw sustained by said slide-bar, and means for reciprocating said slide-bar to cause said jaws to feed a tape across the path of movement of said tape-threading implements.

22. A machine for threading tape into buttons and like articles, including, in combination, threading implements, means for reciprocating said implements, tape-feeding means, and means comprising spaced fingers operated from said tape-feeding means for positioning the tape in the path of movement of said threading implements.

23. A machine for threading tape into buttons and like articles including, in combination, threading implements, means for reciprocating said implements, means for supporting a button in position to be threaded, tape-feeding means, a plurality of spaced tape-positioning fingers, a pivotal support for said fingers, and means for yieldingly actuating said fingers to position the tape in the path of said threading implements.

24. A machine for threading tape into buttons including, in combination, tape-threading implements, means for reciprocating said implements, tape-feeding means, means for sustaining a button in threading position during the threading thereof, and means for engaging the threaded button and ejecting the latter from threading position.

25. A machine for threading tape into buttons and like articles including, in combination, tape-threading means, means for ejecting the threaded articles out of threading position, and a guard for preventing contact of the threaded tape with moving parts of the machine.

26. A machine for threading tape into buttons and like articles including, in combination, tape threading implements, means for reciprocating said implements, tape-feeding means, and means operated from said tape-feeding means for engaging the threaded articles to positively eject the latter from threading position.

27. A machine for threading tape into buttons and like articles including, in combination, tape-threading means, means for feeding an article into threading position, and means for ejecting the threaded article out of threading position comprising a yielding ejector deflected out of ejecting position during the feed of the article into threading position.

28. A machine for threading tape into buttons and like articles including, in combination, tape threading implements, means for reciprocating said implements, tape-feeding means comprising relatively movable tape-gripping jaws, a slide-bar for actuating said jaws, and an article ejector operated from said slide-bar.

29. A machine for threading tape into buttons and like articles including, in combination, tape-threading implements, means for reciprocating said implements, tape-feeding means comprising relatively movable tape-gripping jaws, a slide-bar for actuating said jaws, an article ejector pivotally sustained by said slide-bar, and a spring tending to yieldingly maintain said ejector in ejecting position.

30. In a machine for automatically threading tape into buttons and like apertured articles, the combination with tape-threading implements, and means for actuating said implements, of means for holding a button against the penetrating thrust of said implements, a pivotally supported tape-holding finger adapted to engage the tape between the apertures of the article, a cam for actuating said tape-holding finger, and a spring interposed between the cam and finger to permit the latter to operate upon different thicknesses of articles.

31. A machine for threading tape into buttons and like apertured articles including, in combination, an article-registering pin adapted to engage an aperture of an article, means for feeding an article and the pin engaging the same from an initial into threading position, and means whereby said pin remains in initial position in the absence of an article.

32. A machine for threading tape into buttons and like apertured articles including, in combination, an article-registering pin adapted to engage an aperture of an article, means for moving an article and the pin engaging the same from an initial into threading position, tape-feeding means, and means whereby the movement of said pins renders effective the operation of said tape-feeding means.

33. A machine for threading tape into buttons and like apertured articles including, in combination, an article-registering pin adapted to engage an aperture of an article, means for feeding an article and the pin engaging the same from an initial into threading position, tape-feeding means, a tape-guide normally directing the tape out of the path of operation of said tape-feeding means, and means whereby the operation of said article-registering pin permits the tape-guide to direct the tape into the path of operation of said feeding means.

34. A machine for threading tape into buttons and like apertured articles including, in combination, a tape-guide, tape-feeding means, tape-severing means, and means for preventing said severing means from severing the tape in the absence of an article from threading position.

In testimony whereof, we have signed our names to this specification.

GEORGE M. EAMES.
JOHN C. RINGE.